United States Patent
Prasad et al.

(10) Patent No.: US 6,298,387 B1
(45) Date of Patent: *Oct. 2, 2001

(54) SYSTEM FOR DETECTING A DATA PACKET IN A BITSTREAM BY STORING DATA FROM THE BITSTREAM IN A BUFFER AND COMPARING DATA AT DIFFERENT LOCATIONS IN THE BUFFER TO PREDETERMINED DATA

(75) Inventors: Sanand Prasad, Dallas, TX (US); Samuel Olu Akiwumi-Assani, Beacon; Chin-Sung Lin, Flushing, both of NY (US)

(73) Assignee: Philips Electronics North America Corp, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/679,031

(22) Filed: Jul. 12, 1996

(51) Int. Cl.⁷ .................................................. H04L 7/00
(52) U.S. Cl. .......................... 709/236; 370/509; 375/368; 710/57
(58) Field of Search .................. 395/200.66, 200.65; 370/509, 510, 513, 514; 375/368; 709/235, 236; 710/57

(56) References Cited

U.S. PATENT DOCUMENTS

| | | | |
|---|---|---|---|
| 3,938,106 | * | 2/1976 | Becker et al. .................. 364/468.15 |
| 4,208,650 | * | 6/1980 | Horn .................................... 714/798 |
| 4,344,180 | * | 8/1982 | Cummiskey ......................... 375/116 |
| 4,458,314 | * | 7/1984 | Grimes ................................. 395/303 |
| 4,665,396 | * | 5/1987 | Dieleman .............................. 380/23 |
| 4,922,438 | * | 5/1990 | Ballweg ................................ 370/465 |
| 5,644,577 | * | 7/1997 | Christensen et al. ................ 370/506 |
| 5,668,840 | * | 9/1997 | Takano ................................. 375/368 |
| 5,671,227 | * | 9/1997 | Keller et al. ........................ 370/509 |

OTHER PUBLICATIONS

IBM–TDB (Service processor architecture and microcode algorithm for performing console custmization under customer control TDB, pp. 130–135, Nov. 1988.*

John Uffenbeck (Microcomputers and Microprocessors) 1985, Prentice–Hall, Inc., pp. 415–416.*

* cited by examiner

*Primary Examiner*—Eddie Chan
*Assistant Examiner*—Gautam R. Patel
(74) *Attorney, Agent, or Firm*—Russell Gross

(57) ABSTRACT

Packets in a bitstream are delineated by a) employing a first in, first out buffer (FIFO) with a storage capacity equal to the number of bits in a packet plus the number of bits in the synchronization pattern arranged so that comparison of its head end and tail end with the data pattern of the synchronization data pattern may be made, and b) declaring that a packet is detected when both the head end and the tail end of the FIFO each, substantially simultaneously, contains information equal to the synchronization pattern. Advantageously, the invention may be employed whether or not the bitstream is byte-aligned.

19 Claims, 3 Drawing Sheets

SYSTEM FOR DETECTING A DATA PACKET IN A BITSTREAM BY STORING DATA FROM THE BITSTREAM IN A BUFFER AND COMPARING DATA AT DIFFERENT LOCATIONS IN THE BUFFER TO PREDETERMINED DATA

TECHNICAL FIELD

The invention relates to the field of computer communications, and in particular, to the area of detecting the start of a packet within a bitstream.

BACKGROUND OF THE INVENTION

Packets in a bitstream are often delineated by the appearance therein of a particular data value, e.g., a particular 8 bit wide (byte or octet) data pattern, which may be termed the "synchronization pattern". When the synchronization pattern is 8 bits in length, it is often referred to as a synchronization byte. When explicit framing signals are not received along with the bitstream, the equipment receiving the bitstream can use the synchronization pattern to identify the start of a packet. Doing so, however, is complicated when the particular data value employed as the synchronization pattern can appear elsewhere within the bits that make up the rest of a packet. Such an appearance may occur a) when the value of the synchronization pattern is not reserved solely for identifying the start of a packet, b) when the bitstream does not have any predefined bit group, e.g., byte, alignment, or c) when errors occur in the bitstream.

For example, according to the so-called "motion pictures expert group-2" (MPEG-2) international standard ISO/IEC 13818-1, the data value used for the synchronization pattern, referred to therein as the "sync-byte", is 0×47. Each MPEG-2 transport bitstream packet has a length of 188 bytes, the first of which is the sync-byte. Thus, a sync-byte should appear in the bitstream every 188 bytes.

According to one prior art technique, each 8 bit pattern of an MPEG-2 bitstream is tested to determine if it is a sync-byte. The testing is performed using an eight bit window that is slid one bit each time the test is performed, until a sync-byte is found. When a tested group of eight bits matches the sync-byte, the next 187 eight bit groups are counted as they pass, but they are not tested. Then, the 189th byte is tested to determine if it is a sync-byte. If so, it is determined that the preceding 188 bytes, i.e., the first found sync-byte and the counted 187 eight bit groups, were likely to have been a packet. The process is then repeated several times to minimize the chance that the apparent detection of sync-bytes spaced apart by the length of one packet is the result of a value equal to that of the sync-byte randomly appearing in the bitstream at the correct interval and not actual packet delineating sync-bytes. Note that the appearance in the bitstream of a value equal to that of the sync-byte at a position where a sync byte should not appear is referred to as "sync-byte emulation". If ever the 189th 8 bit pattern does not conform to the sync-byte, the process is restarted.

Disadvantageously, in applications where there is sync-byte emulation, this technique may be slow to determine that a packet has been received. Also, the delineation process causes the loss of the data of all of the packets used to determine the packet delineation.

SUMMARY OF THE INVENTION

An improvement in the delineation of packets in a bitstream is achieved, in accordance with the principles of the invention, by 1) employing a first in, first out buffer (FIFO) that has a) an effective storage capacity equal to the number of bits in a packet plus the number of bits in the synchronization pattern and b) is arranged so that a comparison may be made of the data in its head end and its tail end with the data pattern of the synchronization pattern, and 2) declaring that a packet is detected when both the head end and the tail end of the FIFO each, substantially simultaneously, contains information equal to the synchronization pattern. In the event that packets within a bitstream may have different lengths, the effective storage capacity of the FIFO may be adjusted if the packet length to be detected is known a priori, or the FIFO may be arranged to have multiple simultaneous effective tail ends. If different packets of the bitstream may have different synchronization patterns, multiple comparators may be employed to check for valid combinations of synchronization patterns, and this may be done at proper displacements within the bitstream. A state machine may be employed to keep track of complex cycles of synchronization patterns that may be expected. Advantageously, the invention may be employed whether or not the bitstream is byte-, or other group of bits-aligned.

In one embodiment of the invention, data from the incoming bitstream is supplied to the FIFO. Once the FIFO is filled, each time a new unit of data is suppled to the FIFO the head end and the tail end thereof are both checked to determine if they contain the synchronization pattern. If so, a packet is preliminary declared and the checking and preliminary declaration process is repeated a predetermined number of times, but only at intervals of time equal to the time necessary for an entire packet to exit the FIFO rather than each time a new unit of data is supplied to the FIFO. These repetition are performed to assure that the synchronization pattern is validly detected at the correct intervals within the bitstream, thus minimizing the chance of a false packet delineation due to emulation of the synchronization pattern. Performance of each repetition only at the packet interval is contingent upon the prior repetition resulting in a preliminary packet declaration. Upon successful completion of all repetitions, packets are then indicated to be valid and they are delineated each time tail end data completes transiting through the FIFO to the head end, provided that the tail end contains a synchronization pattern at that time. If any of the repetitions prior to declaring packets to be valid fails to result in a preliminary declaration, the process is restarted so that the head end and the tail end of the FIFO are both checked each time a new unit of data is suppled thereto.

DETAILED DESCRIPTION

Figure 1:
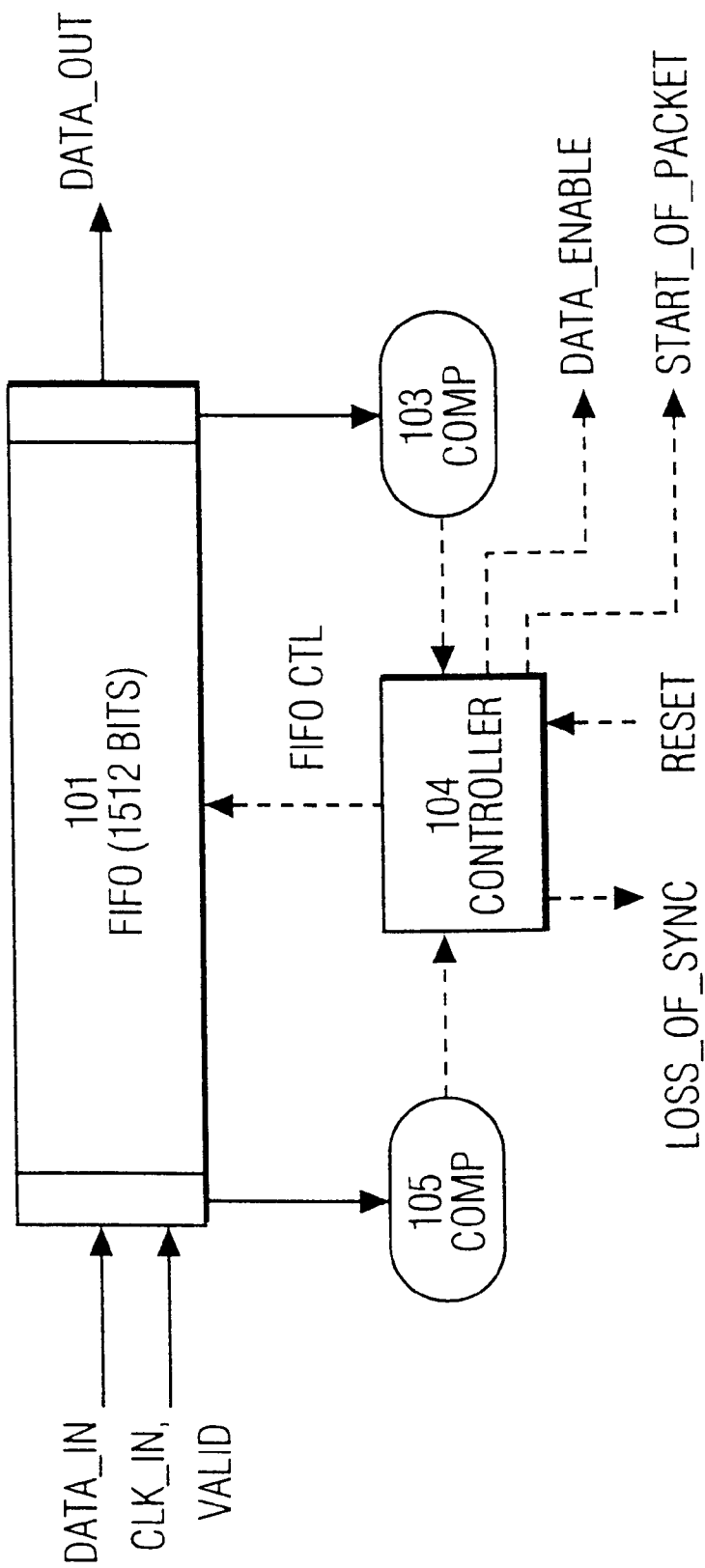
FIG. 1 shows exemplary packet delineator for delineating packets in accordance with the principles of the invention.

FIG. 1 shows exemplary packet delineator 100 for delineating packets in accordance with the principles of the invention. Shown in FIG. 1 are a) first in, first out buffer (FIFO) 101, b) comparators 103 and 105, and c) controller 104. FIFO 101 has a storage capacity equal to the number of bits in a packet plus the number of bits in the synchronization pattern. FIFO 101 is arranged to provide the data stored in its head end and its tail end as outputs.

Comparator 103 is arranged to receive the data pattern stored at the head end of FIFO 101, and to compare it with the synchronization pattern for the data stream being supplied as an input to FIFO 101. The output of comparator 103, which indicates either a match or no match, is supplied to controller 104. Similarly, comparator 105 is arranged to receive as an input the data stored at the tail end of FIFO 101, and to compare it against the synchronization pattern. The output of comparator 105, which indicates either a match or no match, is also supplied to controller 104.

As an example, for use with MPEG-2, FIFO 101 has room to store 1,512 bits, which corresponds to a 188 byte MPEG-2 packet plus an additional eight bit sync-byte. Also for MPEG-2, each of comparators 103 and 105 are eight bits wide, and the sync-byte is defined to be the value 0x47.

Controller 104 is coupled to FIFO 101. FIFO 101 may be operated so that data is flowing in at the tail end of FIFO 101, down to the head end of FIFO 101, and then out of FIFO 101. Typically, FIFO 101 is operated so that data flows through it at the same rate that data is received at FIFO 101. Doing so causes the output from FIFO 101 to be at the same rate as that of the data that is input to FIFO 101. In such a mode FIFO 101 operates like a delay line.

Operationally, packet delineation in an exemplary embodiment of the invention is a four phase process, the phases being: a) unlock, b) sync, c) lock, and d) resync. Upon reset or initialization FIFO 101 is emptied and packet delineator 100 enters the unlock phase. Data received at FIFO 101 flows therethrough from the tail end to the head end without any delay other than that necessary to pass through the empty FIFO, i.e., the "bucket brigade" delay necessary for the data to be passed from position to position in the FIFO. A data enable signal, which is supplied by controller 104 and when asserted indicates that the data from FIFO 101 can be used, is deasserted to prevent utilization of data which has not been delineated into packets. Also, an optional start of packet signal is used to indicate when a new valid packet is present at the head end of FIFO 101. Such a start of packet signal is not asserted for the entire packet time, e.g., it is asserted only for one byte time as the packet flows out of FIFO 101.

To maintain proper timing, controller 104 may keep count of how much information, e.g., how many bits or how many bytes, are stored in FIFO 101. When it is determined that FIFO 101 has just become completely full, comparator 103 tests to determine if the synchronization pattern, e.g., the sync byte 0x47 for MPEG-2, appears at the head end of FIFO 101 while comparator 105 tests to determine if the synchronization pattern appears at the tail end of FIFO 101. In the event that at least one of comparators 103 and 105 are not detecting a match, the system remains in the unlock phase and the tail end data and the head end data are retested each time a new unit of data is entered into FIFO 101.

However, if both comparators 103 and 105 are detecting the synchronization pattern at substantially the same time, controller 104 detects this fact, and assumes therefrom that a packet is stored in FIFO 101. Therefore, the sync phase is entered. Note that the boundaries of such a packet are from the head end of FIFO 101 back to one byte prior to it tail end.

During the sync phase, the packet boundaries detected during the unlock phase are used to test subsequent portions of the bit stream for packets. In particular, such packets are expected to be delineated by the appearance of the synchronization pattern at locations which are integral multiples of the packet length from the location of the detected head end synchronization pattern. Thus, a packet is detected in the sync phase only when a) each of comparators 103 and 105 determine that they have substantially simultaneously detected the synchronization pattern, as before, and also b) that the expected start of the packet is at the head end of FIFO 101. This may be achieved by counting the number of bits, or bytes, that pass through a predetermined location in FIFO 101, e.g., the head end, and only testing when the same amount of data as is contained in a complete packet has passed through FIFO 101. In the event that an expected packet is not detected as anticipated during the sync phase, the system reverts back to the unlock phase.

Upon detecting N packets in a row, which is done to eliminate the likelihood of locking on to a simulated, but false, sequence of the synchronization pattern repeating at a separation of the packet length, the sync phase is completed and the lock phase is begun. The value of N is determined by the implementor. Of course, a higher value of N ensures a greater likelihood that the packets are properly delineated while a lower value of N will result in a faster synchronization time.

Note that, preferably, neither of the above-mentioned data enable or start of packet signals, which are used to indicate, respectively, the presence of valid data and the start of a delineated packet, are asserted during the sync phase, so that the data flowing through FIFO 101 during the sync phase is not used. However, advantageously, the data of the Nth delineated packet is still stored in FIFO 101 upon its delineation. Therefore, the Nth packet need not be discarded, as occurred in the prior art, but instead may be utilized.

In the lock phase the start of packet signal may be asserted each time the sync-byte of a packet is moved out of the head end of FIFO 101. This ensures that the data flowing out of FIFO 101 is always framed. Additionally, in the lock phase, controller 104 continues to check that comparator 103 and comparator 105 are detecting the synchronization pattern at the appropriate locations in the data stream.

In the event of a failure to properly detect the sync-byte during the lock phase, the resync phase is entered. In the resync phase repeated checks are made for the synchronization pattern at locations that are predicted based on the locations of the synchronization pattern that were originally found for the unlock phase. Up to M checks, where M is less than N, may be performed. During the resync phase it is assumed that the predicted locations are correct but there was an error in the data signal. Thus, the data enable signal may remain asserted during the resync phase and the start of packet signal asserted at each predicted packet time. A loss of synchronization will be declared, and controller 104 will assert the loss of sync signal, in the event of a failure to find the synchronization pattern at least once within the allowed M attempts. A reset may be required to restart the synchronization process once the loss of sync signal has been asserted. In the event that the synchronization is found at the predicted location, the system returns to the lock phase.

Figure 2:
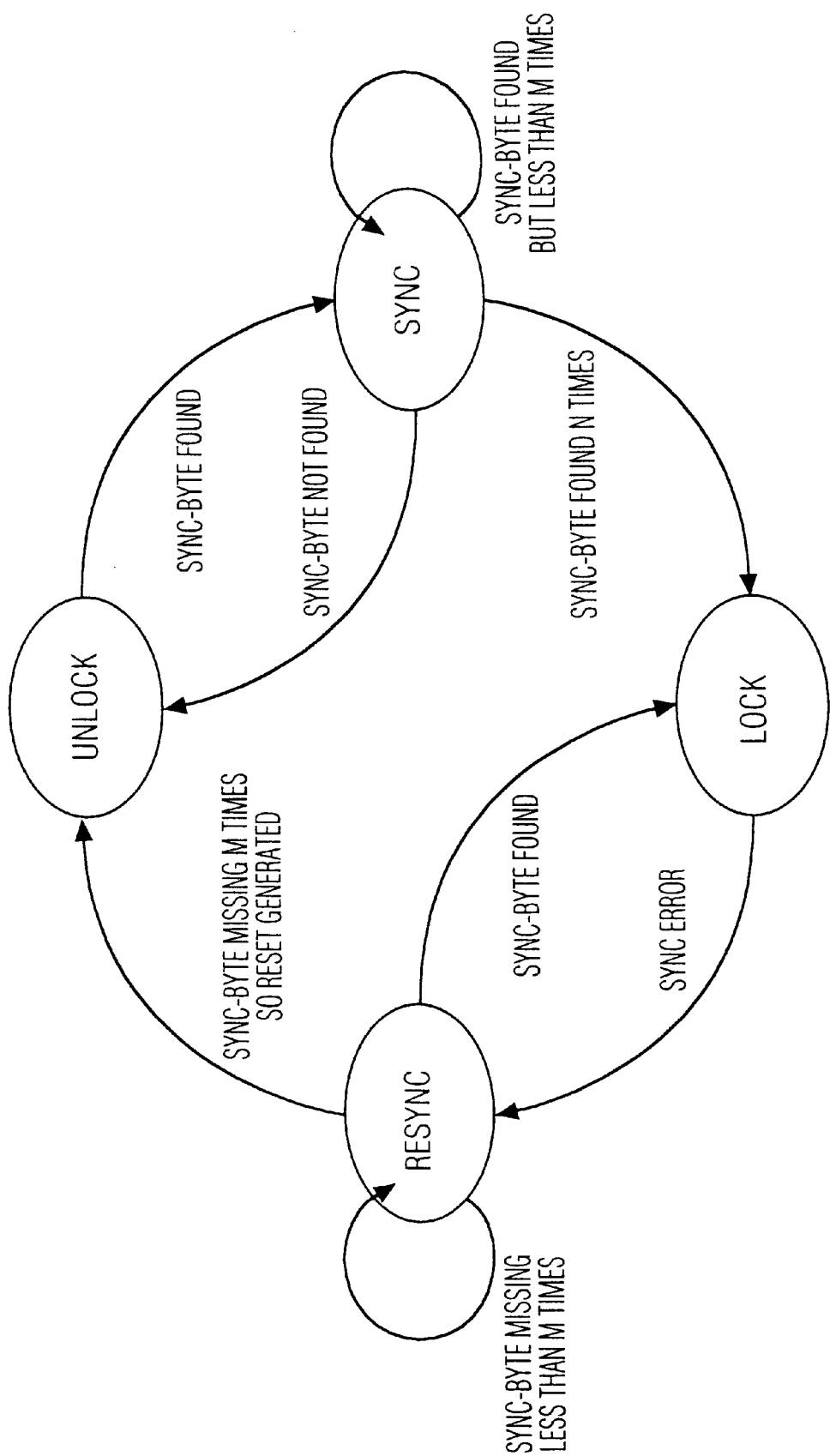
FIG. 2 shows an exemplary state transition diagram for the packet delineator shown in FIG. 1.

The foregoing state transitions are illustrated in the state diagram shown in FIG. 2.

Figure 3:
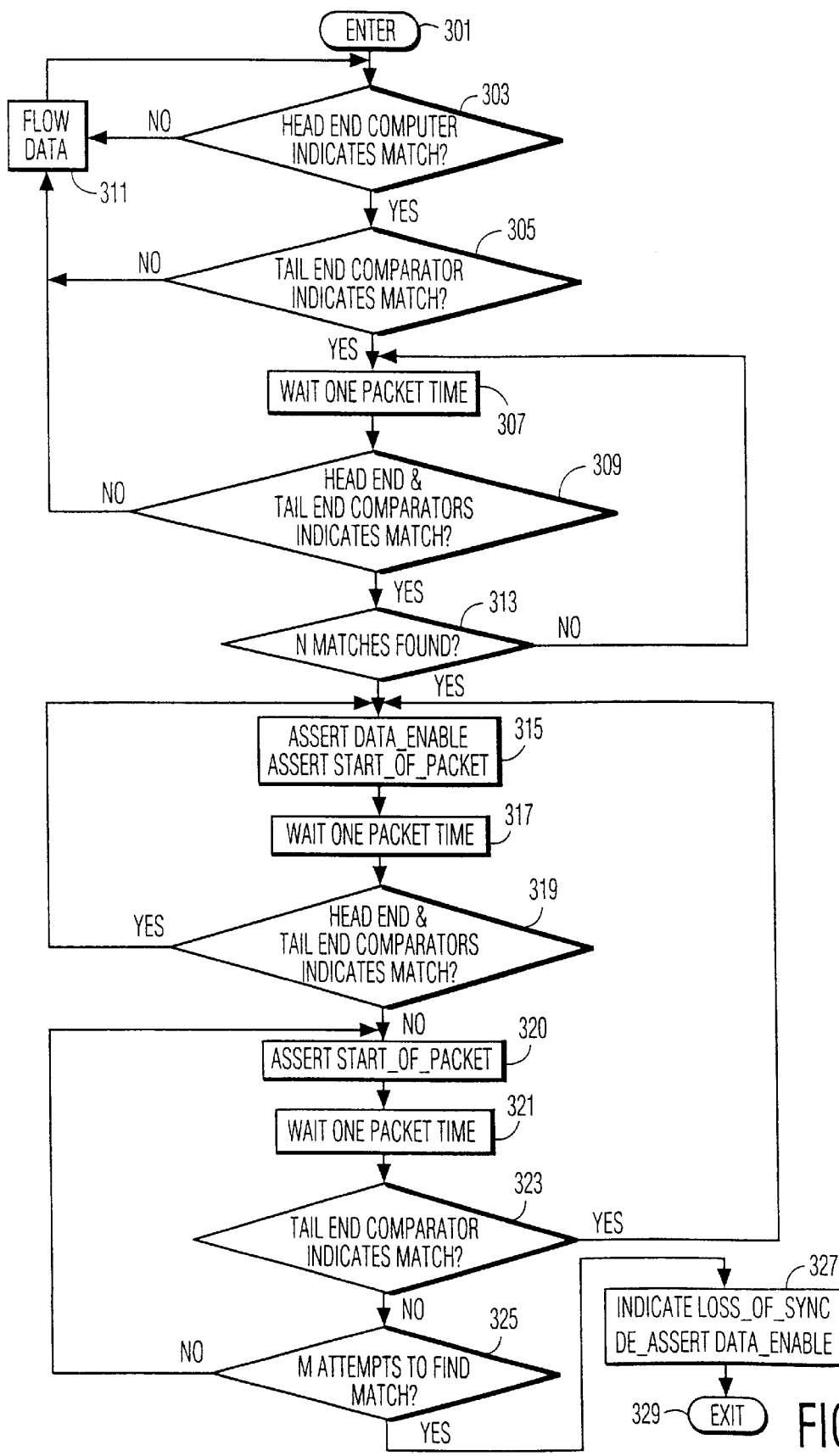
FIG. 3 shows a flow chart of an exemplary process performed by the controller of the packet delineator of FIG. 1 for delineating packets.

FIG. 3 shows a flow chart of an exemplary process performed by controller 104 in operating packet delineator 100 to delineate packets. The process is entered, in step 301, upon resetting of controller 104 and the entire system shown in FIG. 1, while a first unit of data flows into the tail end of FIFO 101. Next, conditional branch point 303, tests to determine if head end comparator 103 indicates that the data at the head end of FIFO 101 matches with the synchronization pattern. If the test result in step 303 is YES, control passes to conditional branch point 305, which tests to determine if tail end comparator 105 indicates that the data at the tail end of FIFO 101 matches the synchronization pattern. If the test result in step 305 is YES, control passes to step 307, in which controller 101 waits one packet time. During this time, data continues to flow through FIFO 101, so that the data that was previously in the tail end of FIFO 101 appears at the head end of FIFO 101. Thereafter, in conditional branch point 309, controller 104 tests to determine if each of head end and tail end comparators 103 and 105 substantially simultaneously indicates a match. If so, the synchronization pattern was found in the proper position after one packet time of its previously having been found, which indicates that it is likely that the data stored from the head end of FIFO 101 to one synchronization pattern in length in from the tail end of FIFO 101 is a packet.

If any of the test results in step 303, 305, or 309 are NO, control passes to step 311, in which the data being examined by the comparator flows one unit downward in FIFO 101. This flowing may be done on a single bit basis, or if the bits are arranged into larger groups, e.g., bytes, that have known boundaries, the flowing may be by the number of bits in such a group. Such a negative result in steps 303, 305, or 309 indicates that it is unlikely that the data stored from the head end of FIFO 101 to one synchronization pattern length in from the tail end of FIFO 101 is a packet.

If the test result in step 309 is YES, control passes to conditional branch point 313, which tests to determine if N matches have been found. If N matches have been found, this indicates that there is a likelihood acceptable to the implementor that each time a match is found the head end of FIFO 101 is the synchronization pattern of a packet. If the test result in step 313 is NO, control passes back to step 307, and the process continues as described above. If the test result in step 313 is YES, control passes to step 315, in which controller 104 asserts, or maintains asserted, the data enable output, and, optionally, asserts the start of packet signal for the packet currently stored in FIFO 101.

Next, controller 104 waits one packet time while the data packet stored in FIFO 101 is read out, except for the data that was at the tail end, which becomes the new head end data, while new data is received and stored in FIFO 101. Then, conditional branch point 319 tests to determine if head end comparator 103 and tail end comparator 105 respectively indicate matches of the head end and tail end data to the synchronization pattern. If the test result in step 319 is YES, control passes back to step 315, and the process continues as described above. If the test result in step 319 is NO, control passes to step 320, in which the start of packet signal may be asserted. Next, in step 321, controller 104 waits one packet time so that new data, except for the tail end, is cycled through FIFO 101.

Thereafter, in conditional branch point 323, controller 104 tests to determine if the tail end of FIFO 101 matches the synchronization pattern. If the test result in step 323 is YES, control passes back to step 315, and the process continues as described above. If the test result of step 323 is NO, control passes to conditional branch point 325, which tests to determine if M attempts have already been made to find a match of the tail end data to the synchronization pattern after the test result in step 319 was NO. If the test result in step 325 is NO, control passes back to step 320. If the test result in step 325 is YES, control passes to step 327, in which controller 104 indicates a loss of synchronization by asserting its loss of sync signal and the data enable signal is deasserted. Thereafter, the process exits in step 329.

In the event that different types of packets within a bitstream may have different, predetermined lengths. If so, the effective storage capacity of the FIFO may be adjusted when the packet length to be detected is known a priori.

Alternatively, the FIFO may be arranged to have multiple simultaneous effective tails, each of which may be checked for a valid synchronization pattern. In another such embodiment, more than one FIFO, each being of a different length corresponding to each possible packet size plus an additional synchronization pattern, may be used in parallel. Each such FIFO would be associated with its own set of comparators, and all would be controlled so as to operate in concert.

If different packets of the bitstream may have different synchronization patterns, multiple comparators may be employed, at the head end and/or tail end as appropriate, to check for valid combinations of synchronization patterns at proper displacements within the bitstream. A state machine may be employed to keep track of complex cycles of synchronization patterns that may be expected.

Also, other modes and methods of controlling FIFO 101 so as to implement the invention will be readily apparent to those of ordinary skill in the art.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for delineating a packet in a bitstream, comprising:

A first in, first out buffer having a storage capacity equal to a length of said packet plus a number of bits in a synchronization pattern for said packet, said first in, first out buffer being arranged (i) to pass data of said bitstream from a tail end of the first in, first out buffer at which the data is input to a head end of the first in, first out buffer and (ii) so that a predetermined number of bits at the head end and at the tail end are suppliable as output substantially simultaneously;

a first comparator, for comparing the output of the head end of said first in, first out buffer with the synchronization pattern when the buffer is full, and for signaling if there is a match between the output of the head end and the first the synchronization pattern;

a second comparator, for comparing the output of the tail end of said first in, first out buffer with the synchronization pattern when the buffer is full, and for signaling if there is a match between the output of the tail end and the synchronization pattern; and means for indicating detection of a packet when both said first comparator and said second comparator indicate matches and said first in, first out buffer is filled with data of said bitstream that is between said predetermined number of bits at the head end and said predetermined number of bits at the tail end.

2. The apparatus as defined in claim 1 wherein said first in, first out buffer is a bit-wide buffer that passes the data of said bitstream therethrough one bit at a time.

3. The apparatus as defined in claim 1 wherein said first in, first out buffer is arranged according to units of a fixed multiple number of bits.

4. The apparatus as defined in claim 3 wherein said number is eight.

5. The apparatus as defined in claim 3 wherein said fixed number is a power of two.

6. The apparatus as defined in claim 1 wherein said first and second predetermined data patterns are bytes.

7. The apparatus as defined in claim 1 wherein the first and second predetermined data patterns are the same, and are the byte 0x47.

8. The apparatus as defined in claim 1 wherein at least one of said first and second data patterns has a length other than eight bits.

9. The apparatus as defined in claim 1 wherein the first and second predetermined data patterns are the same eight bit pattern.

10. The apparatus as defined in claim 1 wherein the first and second predetermined data patterns are the same pattern which has a length other than eight bits.

11. The apparatus as defined in claim 1 wherein said means for indicating detection of a packet so indicates only when both said first comparator and said second comparator have indicated an uninterrupted series of a predetermined number of matches, each match of said series occurring at intervals of time equal to the time required for an entire packet length of data to flow through said first in, first out buffer.

12. Apparatus for delineating packets in a bitstream, each of said packets of said bitstream having one of a plurality of predefined lengths, said apparatus comprising:
  a first in, first out buffer having a storage capacity equal to a length of a one of said packets having a greatest length plus a number of bits in a synchronization pattern for said packet, said first in, first out buffer being arranged (i) to pass data of said bitstream from a tail end of the first in, first out buffer at which the data is input to a head end of the first in, first out buffer and (ii) so that a predetermined number of bits at the head end and at locations in the bitstream that are distant from said head end by an amount equal to each packet length plus the number of bits in a synchronization pattern are suppliable as output substantially simultaneously;
  first comparison means for comparing the output of the head end of said first in, first out buffer with the synchronization pattern when the buffer is full, and for signaling if there is a match between the output of the head end and the synchronization pattern;
  second comparison means for comparing the data at each of said locations in the bitstream that are distant from said head end by an amount equal to each packet length plus the number of bits in a synchronization pattern with the synchronization pattern when the buffer is full, and for signaling if there is a match between any of the data at each of said locations and the synchronization pattern; and
  means for indicating detection of a packet when both said first comparison means and said second comparison means indicate matches and said first, in first out buffer is filled with the data of said bitstream that is between said predetermined number of bits at the head end and the tail end.

13. The appartus as defined in claim 12 wherein said first comparison means further comprises one or more first comparators, each of said first comparators being for use with a respective one of said first predetermined data patterns and said second comparison means further comprises one or more second comparators, each of said second comparators being for use with a respective one of said second predetermined data patterns, each of said first comparators being associated with one or more of said second comparators, said means for indicating detection of a packet so indicating only when a match is indicated by each of associated ones of said first and said second comparators.

14. The apparatus as defined in claim 13, wherein said means for indicating detection of a packet so indicates only when both said first and said second comparison means have indicated an uninterrupted series of a predetermined number of matches, each match of said series occurring at intervals of time equal to the time required for a predetermined amount of data to flow through said first in, first out buffer, where the predetermined amount of data is equal in length to a distance between the associated ones of said first and said second comparators which previously indicated a match.

15. A method for use in delineating packets in a bitstream, said packets being delineated by a sync-byte, the method comprising the steps of;
  supplying data from said bitstream to a first in, first out buffer, said first in, first out buffer having a storage capacity equal to a length of a packet of said bitstream plus a number of bits in a sync-byte;
  comparing data at a head end of said first in, first out buffer with said sync-byte when the buffer is full;
  comparing data at a tail end of said first in, first out buffer with said sync-byte when the buffer is full, the data at the tail end being compared at substantially the same time as the data at the head end is compared;
  repeating both of the comparing steps each time a new byte is supplied to said first in, first out buffer until both said head end and said tail end of said first in, first out buffer contain a value equal to said sync-byte;
  waiting a length of time equal to a time for a packet to flow through said first in, first out buffer after both said head end and said tail end of said first, in first out buffer contain a value equal to said sync-byte;
  if both said head end and said tail end of said first in, first out buffer contain a value equal to said sync-byte, repeating said waiting step and then both of said comparing steps so long as the result of each sequential subsequent repetition of both of said comparing steps is that both said head end and said tail end of said first in, first out buffer contain a value equal to said sync-byte up to a predetermined number of repetitions;
  restarting said process if ever both said head end and said tail end of said first in, first out buffer do not contain a value equal to said sync-byte; and
  indicating delineation of a packet when said predetermined number of consecutive repetitions is successfully completed.

16. The method as defined in claim 15 wherein said comparing steps are performed substantially simultaneously each time they are performed.

17. The method as defined in claim 15 further comprising the steps of:
  repeating said delineation indicating step so long as the result of each repetition of said comparison steps, which are performed at subsequent intervals of time that are equal to the time for a packet to flow through said first in, first out buffer, is that both said head end and said tail end of said first in, first out buffer contain a value equal to said sync-byte.

18. The method as defined in claim 15 wherein said indicating includes the steps of:
  asserting a valid data signal; and
  asserting a start of packet signal for a period of time less than the time for a packet to flow through said first in, first out buffer.

19. The method as defined in claim 15 further including the step of removing indication of packet delineation whenever the result of each of a predetermined number of repetitions of said tail end comparison step that are performed subsequent to said indicating step and each at a respective time which is offset an integral multiple of the time required for a packet to flow through said first in, first out buffer from the time of the preceding repetition of said tail end comparison step, is that said tail end of said first in, first out buffer does not contain a value equal to said sync-byte.

* * * * *